(12) United States Patent
Vo et al.

(10) Patent No.: US 9,957,436 B2
(45) Date of Patent: May 1, 2018

(54) METHODS OF SIMULTANEOUSLY INTRODUCING A CURABLE RESIN AND CURING AGENT WITH DELAYED CURING

(71) Applicant: Halliburton Energy Services, Inc., Houston, TX (US)

(72) Inventors: Loan K. Vo, Houston, TX (US); Philip D. Nguyen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days. days.

(21) Appl. No.: 15/322,036

(22) PCT Filed: Jul. 28, 2014

(86) PCT No.: PCT/US2014/048508
§ 371 (c)(1),
(2) Date: Dec. 23, 2016

(87) PCT Pub. No.: WO2016/018235
PCT Pub. Date: Feb. 4, 2016

(65) Prior Publication Data
US 2017/0158946 A1    Jun. 8, 2017

(51) Int. Cl.
| | | |
|---|---|---|
| *E21B 43/04* | (2006.01) | |
| *E21B 33/13* | (2006.01) | |
| *C09K 8/575* | (2006.01) | |
| *C09K 8/86* | (2006.01) | |
| *C09K 8/26* | (2006.01) | |
| *C09K 8/40* | (2006.01) | |
| *C09K 8/506* | (2006.01) | |
| *C09K 8/80* | (2006.01) | |
| *E21B 43/267* | (2006.01) | |

(52) U.S. Cl.
CPC .............. *C09K 8/575* (2013.01); *C09K 8/26* (2013.01); *C09K 8/40* (2013.01); *C09K 8/506* (2013.01); *C09K 8/80* (2013.01); *C09K 8/86* (2013.01); *E21B 33/13* (2013.01); *E21B 43/04* (2013.01); *E21B 43/267* (2013.01)

(58) Field of Classification Search
CPC . C09K 8/80; C09K 8/805; C09K 8/68; C09K 8/36; C09K 8/506; C09K 8/72; C09K 2208/32; C09K 8/70; E21B 43/267; E21B 43/26; E21B 43/04; E21B 33/138; E21B 21/00; E21B 43/025
See application file for complete search history.

(56) References Cited

U.S. PATENT DOCUMENTS

| | | |
|---|---|---|
| 6,613,720 B1 | 9/2003 | Feraud et al. |
| 6,632,778 B1 | 10/2003 | Ayoub et al. |
| 6,705,400 B1 | 3/2004 | Nguyen et al. |
| 6,729,404 B2 | 5/2004 | Nguyen et al. |
| 6,962,200 B2 | 11/2005 | Nguyen et al. |
| 7,114,570 B2 | 10/2006 | Nguyen et al. |
| 7,264,052 B2 | 9/2007 | Nguyen et al. |
| 8,574,808 B2 | 11/2013 | Mizuhata et al. |
| 2009/0151943 A1 | 6/2009 | Nguyen et al. |
| 2010/0270023 A1 | 10/2010 | Dusterhoft et al. |
| 2012/0205107 A1 | 8/2012 | Rickman et al. |

OTHER PUBLICATIONS

International Search Report and Written Opinion dated Mar. 31, 2015; International PCT Application No. PCT/US2014/048508.

*Primary Examiner* — Zakiya W Bates
(74) *Attorney, Agent, or Firm* — McGuireWoods LLP

(57) ABSTRACT

A method of treating particles of a particle pack located in a subterranean formation comprising: providing a first emulsion, wherein the first emulsion comprises a curable resin; providing a second emulsion, wherein the second emulsion comprises a curing agent, wherein the curing agent causes the curable resin to cure, wherein both of the first and second emulsions comprise: (A) an internal phase comprising a hydrocarbon liquid; (B) an external phase comprising an aqueous liquid; (C) a stabilizing agent; and (D) a destabilizing agent; introducing the first and second emulsions into the subterranean formation, wherein the first and second emulsions are commingled prior to introduction, and wherein the first and second emulsions are introduced simultaneously; and causing or allowing the curing agent to cure at least some of the curable resin after the step of introducing.

20 Claims, 2 Drawing Sheets

METHODS OF SIMULTANEOUSLY INTRODUCING A CURABLE RESIN AND CURING AGENT WITH DELAYED CURING

TECHNICAL FIELD

Additives are often used for water control and fines control. Curable resins are used to consolidate particles of a particle pack. It can be desirable to delay the curing of a curable resin system until the resin has reached the area of a wellbore to be treated.

BRIEF DESCRIPTION OF THE FIGURES

The features and advantages of certain embodiments will be more readily appreciated when considered in conjunction with the accompanying figures. The figures are not to be construed as limiting any of the preferred embodiments.

DETAILED DESCRIPTION OF THE INVENTION

Figure 1B:
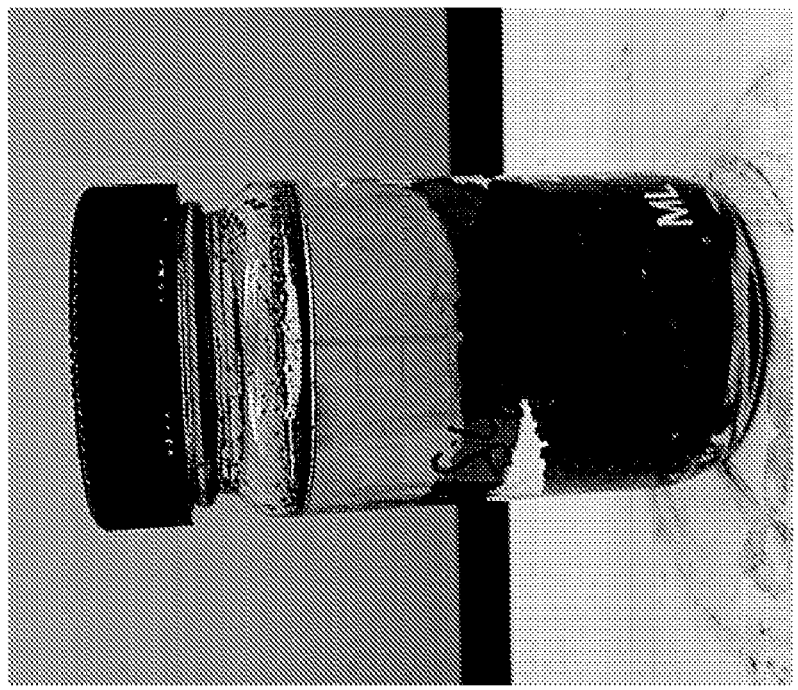
FIGS. 1A and 1B are photographs of a control fluid containing a brine, sand particles, and coal fines and a test fluid further containing a curable resin system according to certain embodiments.

As used herein, the words "comprise," "have," "include," and all grammatical variations thereof are each intended to have an open, non-limiting meaning that does not exclude additional elements or steps.

As used herein, a "fluid" is a substance having a continuous phase that tends to flow and to conform to the outline of its container when the substance is tested at a temperature of 71° F. (22° C.) and a pressure of 1 atmosphere "atm" (0.1 megapascals "MPa"). A fluid can be a liquid or gas. A homogenous fluid has only one phase; whereas a heterogeneous fluid has more than one distinct phase. A heterogeneous fluid can be: a slurry, which includes a continuous liquid phase and undissolved solid particles as the dispersed phase; an emulsion, which includes a continuous liquid phase and at least one dispersed phase of immiscible liquid droplets; a foam, which includes a continuous liquid phase and a gas as the dispersed phase; or a mist, which includes a continuous gas phase and liquid droplets as the dispersed phase.

Oil and gas hydrocarbons are naturally occurring in some subterranean formations. In the oil and gas industry, a subterranean formation containing oil or gas is referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from the wellbore is called a reservoir fluid.

A well can include, without limitation, an oil, gas, or water production well, or an injection well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered the region within approximately 100 feet radially of the wellbore. As used herein, "into a well" means and includes into any portion of the well, including into the wellbore or into the near-wellbore region via the wellbore. As used herein, "into a subterranean formation" means and includes into any portion of a subterranean formation including, into a well, wellbore, or the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore that can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

During wellbore operations, it is common to introduce a treatment fluid into the well. Examples of common treatment fluids include, but are not limited to, drilling fluids, spacer fluids, completion fluids, and work-over fluids. As used herein, a "treatment fluid" is a fluid designed and prepared to resolve a specific condition of a well or subterranean formation, such as for stimulation, isolation, gravel packing, or control of gas or water coning. The term "treatment fluid" refers to the specific composition of the fluid as it is being introduced into a well. The word "treatment" in the term "treatment fluid" does not necessarily imply any particular action by the fluid.

There are primary and remedial wellbore operations in which it is desirable to consolidate particles together. Examples of particles that are commonly consolidated together to form a consolidated pack of particles are proppant, gravel, and formation particles, such as sand and fines. Examples of wellbore operations that commonly use consolidated packs include remedial proppant/gravel treatments, near-wellbore formation sand consolidation treatments for sand control, consolidating-while-drilling target intervals, and plugging-and-abandonment of wellbores in subterranean formations.

Proppant is commonly used in conjunction with hydraulic fracturing operations (fracing operations). A fracturing fluid is pumped using a frac pump at a sufficiently high flow rate and high pressure into the wellbore and into the subterranean formation to create or enhance a fracture in the subterranean formation. Creating a fracture means making a new fracture in the formation. Enhancing a fracture means enlarging a pre-existing fracture in the formation. The newly-created or enhanced fracture will tend to close together after pumping of the fracturing fluid has stopped. To prevent the fracture from closing, a material must be placed in the fracture to keep the fracture propped open. A material used for this purpose is often referred to as a "proppant." The proppant is in the form of solid particles, which can be suspended in the fracturing fluid, carried down hole, and deposited in the fracture as a "proppant pack." The proppant pack props the fracture in an open position while allowing fluid flow through the permeability of the pack.

Gravel is used in gravel packing operations. Gravel packing can be part of sand control techniques that are used to prevent production of particles from the subterranean formation, such as sand and fines. In gravel pack operations, a sand screen is placed in the wellbore and the surrounding annulus packed with prepared gravel of a specific size designed to prevent the passage of formation sand into the production tubing string. The primary objective is to stabilize the formation while causing minimal impairment to well productivity. Formation particles can also build up behind the sand screen to form a pack.

If the particles, such as the proppant or gravel are not held in place, then the particles can flow towards the wellhead during production. This undesirable migration can cause damage to wellbore equipment and potentially a loss of integrity, for example to the fracture or wellbore. Therefore, it is often desirable to coat the particles with a resin to form a consolidated pack. The resin should have an affinity for the particles and should coat the particles. The resin can be a tacky resin that acts as a glue to bind the particles of the pack together. The resin can also be part of a consolidation system that comprises a curable resin and a curing agent. The curing agent causes the curable resin to cure and become hard and solid via a chemical reaction, wherein heat can increase the reaction rate. After the resin cures, the particles of the pack are consolidated. The particles of a consolidated pack can then remain in the desired location either temporarily or permanently.

Some curing agents can cause a curable resin to immediately begin curing when the agent and resin come in contact with one another. Obviously, it is desirable for the curable resin to cure after the resin has coated the desired particles (e.g., proppant, gravel, formation fines). Therefore, in these instances, it may be desirable to delay curing of the curable resin until a desired time after introduction into a well. However, in order to delay the curing of a curable resin using a curing agent, current technology requires two separate treatment fluids, each one containing either the curable resin or the curing agent to be introduced into a well sequentially-generally with the curable resin being introduced first and the curing agent being introduced afterwards. This process can add to the overall cost and time to complete these wellbore operations. Thus, there is a need for improved methods of delaying curing of a curable resin using a curing agent.

It has been discovered that two different emulsions can be used to simultaneously introduce a curable resin and a curing agent into a well, while delaying curing of the curable resin via the curing agent until a desired amount of time has elapsed.

According to an embodiment, a method of treating particles of a particle pack located in a subterranean formation comprising: providing a first emulsion, wherein the first emulsion comprises a curable resin; providing a second emulsion, wherein the second emulsion comprises a curing agent, wherein the curing agent causes the curable resin to cure, wherein both of the first and second emulsions comprise: (A) an internal phase comprising a hydrocarbon liquid; (B) an external phase comprising an aqueous liquid; (C) a stabilizing agent; and (D) a destabilizing agent; introducing the first and second emulsions into the subterranean formation, wherein the first and second emulsions are commingled prior to introduction, and wherein the first and second emulsions are introduced simultaneously; and causing or allowing the curing agent to cure at least some of the curable resin after the step of introducing.

According to another embodiment, the curable resin is part of an aqueous-based fluid and the curing agent is part of an emulsion like the second emulsion.

It is to be understood that the discussion of preferred embodiments regarding the treatment fluid or any ingredient in the treatment fluid, is intended to apply to all of the method embodiments. Any reference to the unit "gallons" means U.S. gallons.

The methods are for treating particles of a particle pack located in a subterranean formation. The particles of the particle pack can be any particles that are commonly consolidated in a subterranean formation. The particles can be proppant, gravel, and subterranean formation particles, such as sand and/or fines, or combinations thereof. The subterranean formation can be part of a reservoir or adjacent to a reservoir. The subterranean formation can be penetrated by a wellbore. The particles of the particle pack can also be located within the wellbore, including an annulus of the wellbore.

The methods include providing a first emulsion and a second emulsion. The methods can also include forming or preparing the first and second emulsions. The methods include providing an aqueous-based fluid and an emulsion. The methods can also include forming the aqueous-based fluid and the emulsion. The steps of forming can include mixing the ingredients of the aqueous-based fluid and the emulsion or the ingredients of the first and second emulsions together using a suitable mixing apparatus. The step of forming can be performed on the fly at the location of a well that penetrates the subterranean formation. It is to be understood that the aqueous-based fluid and the emulsion and the first and second emulsions are initially stand-alone fluids and are not commingled or mixed together until a time prior to introduction into the subterranean formation.

The aqueous-based fluid or the first emulsion comprises a curable resin. The curable resin can be any compound that is capable of curing (i.e., the process of gaining compressive strength and becoming hard). Preferably, the curable resin cures via a chemical reaction with the curing agent. The curable resin can have an affinity for the particles of the particle pack. In this manner, the curable resin can be attracted to the particles. The curable resin can also coat the particles prior to curing. The curable resin can also chemically bond with the surfaces of the particles. According to certain embodiments, the curable resin is an epoxy, diepoxy, or polyepoxy resin. For example, the curable resin can be bisphenol A glycidyldiepoxy, glycidyl propyltrimethoxysilane. As used herein, an epoxy resin is a compound that contains one epoxide functional group, a diepoxy resin is a compound containing two epoxide functional groups, and a polyepoxy resin is a compound that contains three or more epoxide functional groups. Epoxy, diepoxy, and polyepoxy resins are a class of reactive pre-polymers and polymers which contain epoxide groups. As such, the curable resin can be polymer molecules. If the curable resin is a pre-polymer, then preferably the curable resin forms a polymer before, during, or after introduction into the subterranean formation. Epoxy resins may be cross-linkable with a wide range of curing agents. As used herein, a "cross-link" and all grammatical variations thereof is a bond between two or more polymer molecules. The curable resin can be in a concentration in the range of about 0.1% to about 10% weight by weight of the resin composition, preferably about 0.5% to about 5% weight by weight of the resin composition. The curable resin can also be in a concentration such that the particles of the particle pack are consolidated.

The second emulsion or emulsion contains the curing agent. The curing agent causes the curable resin to cure. Unlike other curable resins that can cure due to heat or other physical parameters, the curing agent is responsible for causing the curable resin to cure. The curing agent can also cross-link the polymer molecules of the curable resin. The curing agent can be a dimer acid, a dimer diamine, or a trimer acid. The curing agent can be in a concentration in the range of about 0.1% to about 10%, preferably about 0.5% to about 5% weight by weight of the resin composition. The curing agent can also be in a ratio of about 1:10 to about 10:1 by volume of the curable resin. The curing agent can also be in a concentration such that some of, preferably a majority of, and most preferably all of, the curable resin cures after introduction into the subterranean formation. The curing agent can also be in a concentration such that some of, preferably a majority of, and most preferably all of, the curable resin cures after a desired amount of time after introduction into the subterranean formation.

According to certain embodiments, the curing agent is also a tackifying agent. A tackifying agent is a substance that possesses a sticky or tacky quality and is capable of binding particles together or catching particles as the particles flow by and make contact with the agent. It has been discovered that the curing agents disclosed herein remain a tackifying agent even after the curing agent causes the curable resin to cure.

An example of a suitable curable resin and curing agent as well as the cross-linked cured resin is illustrated below, where the compound on the left is a curable epoxy resin and the compound on the right is a dimer acid curing agent, and where R=aliphatic hydrocarbons, aromatic hydrocarbons, ethylene ether, propylene ether, and n=any number between 1 and 20.

isoalkane (isoparaffin), a linear alkane (paraffin), or a cyclic alkane (cycloparaffin). An example of an alkane is BAROID ALKANE™ base fluid, marketed by Halliburton Energy Services, Inc. Examples of suitable paraffins include, but are not limited to: BIO-BASE 360® (an isoalkane and n-alkane); BIO-BASE 300™ (a linear alkane); BIO-BASE 560® (a blend containing greater than 90% linear alkanes); and ESCAID 110™ (a mineral oil blend of mainly alkanes and cyclic alkanes). The BIO-BASE liquids are available from Shrieve Chemical Products, Inc. in The Woodlands, Tex. The ESCAID liquid is available from ExxonMobil in Houston, Tex. The unsaturated hydrocarbon can be an alkene, alkyne, or aromatic. Preferably, the unsaturated hydrocarbon is an alkene. The alkene can be an isoalkene, linear alkene, or cyclic alkene. The linear alkene can be a linear alpha olefin or an internal olefin. An example of a linear alpha olefin is NOVATEC™, available from M-I SWACO in Houston, Tex. Examples of internal olefins include, ENCORE® drilling fluid and ACCOLADE® drilling fluid, marketed by Halliburton Energy Services, Inc.

The internal phase can include dissolved materials or undissolved solids. According to certain embodiments, the curable resin and the curing agent are hydrophobic. The curable resin and the curing agent can be soluble or miscible in the hydrocarbon liquid. The internal phase can further include the curable resin and the curing agent.

The internal phase can be in a concentration in the range of about 0.5% to about 60% by volume of the external phase.

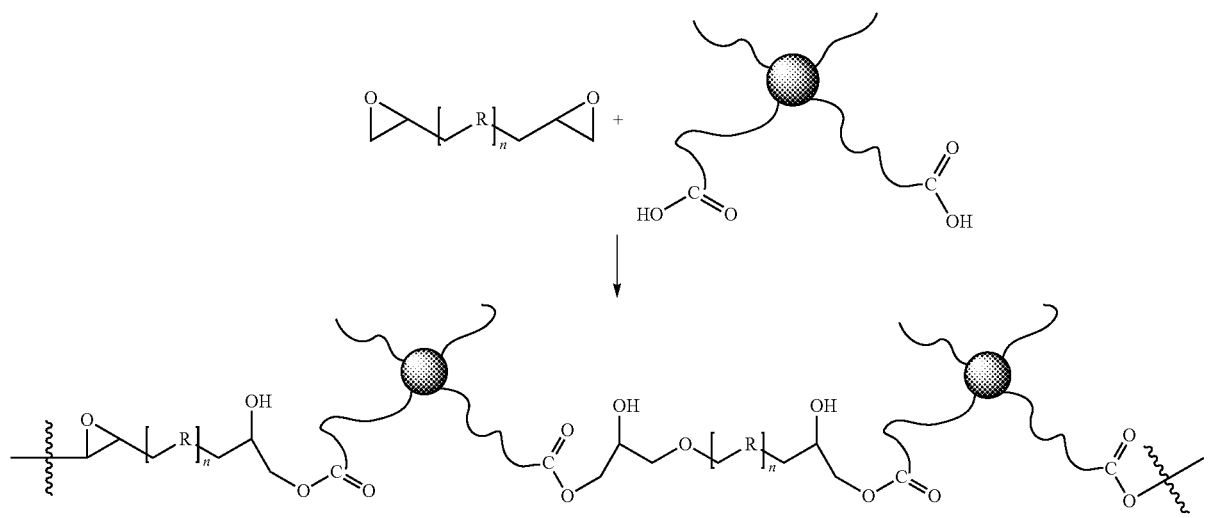

All of the emulsions (i.e., the emulsion, the first emulsion, and the second emulsion) comprise an internal phase comprising a hydrocarbon liquid. Preferably, the hydrocarbon liquid is selected from the group consisting of: a fractional distillate of crude oil; a fatty derivative of an acid, an ester, an ether, an alcohol, an amine, an amide, or an imide; a saturated hydrocarbon; an unsaturated hydrocarbon; a branched hydrocarbon; a cyclic hydrocarbon; and any combination thereof. Crude oil can be separated into fractional distillates based on the boiling point of the fractions in the crude oil. An example of a suitable fractional distillate of crude oil is diesel oil. A commercially-available example of a fatty acid ester is PETROFREE® ESTER base fluid, marketed by Halliburton Energy Services, Inc. The saturated hydrocarbon can be an alkane or paraffin. Preferably, the saturated hydrocarbon is a paraffin. The paraffin can be an The internal phase can also be in a concentration of about 15% to about 45% by volume of the external phase.

The emulsions include an external phase comprising an aqueous liquid. According to certain other embodiments, the curable resin is part of an aqueous-based fluid. As used herein, the term "aqueous-based" means a fluid wherein an aqueous liquid is in the greatest concentration by volume of the fluid and is the solvent of a solution or the external phase of a heterogeneous fluid. According to an embodiment, the aqueous-based fluid is not an emulsion. The aqueous-based fluid can be a slurry in which the aqueous liquid is the external phase and the curable resin is part of the internal phase.

The aqueous liquid can be selected from the group consisting of freshwater, saltwater, sea water, brackish water, and combinations thereof. The aqueous liquid can include dissolved substances or undissolved substances. For example, the aqueous liquid can contain a water-soluble salt. Examples of water-soluble salts include sodium chloride, calcium chloride, potassium chloride, magnesium chloride, potassium acetate, potassium formate, magnesium sulfate, and combinations thereof.

The emulsions include a stabilizing agent. The stabilizing agent can provide a stable emulsion. As used herein, a "stable" emulsion means that the emulsion will not cream, flocculate, or coalesce and most or all of the curable resin is physically separated from coming in contact with the curing agent. As used herein, the term "cream" means at least some of the droplets of the internal phase converge towards the surface or bottom of the emulsion (depending on the relative densities of the liquids making up the external and internal phases). The converged droplets maintain a discrete droplet form. As used herein, the term "flocculate" means at least some of the droplets of the internal phase combine to form small aggregates in the emulsion. As used herein, the term "coalesce" means at least some of the droplets of the internal phase combine to form much larger drops in the emulsion.

According to certain embodiments, the stabilizing agent is a surfactant. A surfactant is an amphiphilic molecule comprising a hydrophobic tail group and a hydrophilic head group. If a surfactant is in a sufficient concentration in a liquid, then the surfactant molecules can form micelles. A "micelle" is an aggregate of surfactant molecules dispersed in a solution. A surfactant in an aqueous solution can form micelles with the hydrophilic heads in contact with the surrounding aqueous solvent, sequestering the hydrophobic tails in the micelle center. The surfactant must be in a sufficient concentration to form micelles, known as the critical micelle concentration. The critical micelle concentration is the concentration of surfactant above which micelles are spontaneously formed.

According to certain embodiments, the stabilizing agent forms micelles with the curable resin or the curing agent (depending on the emulsion) being sequestered in the micelle center within the internal phase of the emulsions. The stabilizing agent can be in a concentration in the range of about 0.1% to about 10% by volume of the emulsion. The stabilizing agent can also be in at least a sufficient concentration such that the stabilizing agent forms micelles and the curable resin or the curing agent are sequestered in the center of the micelles. The stabilizing agent can also be in the critical micelle concentration. Accordingly, the first emulsion can contain micelles wherein the curable resin is sequestered in the micelle center and the second emulsion or emulsion can contain micelles wherein the curing agent is sequestered in the micelle center. Without being limited by theory, it is believed that this sequestration of the curable resin and the curing agent in each individual emulsion's micelles allows the two fluids (i.e., the aqueous-based fluid and the emulsion or the first and second emulsions) to be introduced simultaneously without initiating curing of the curable resin. This physical separation, due to micelle sequestration, can allow the curable resin and the curing agent to be simultaneously pumped into the subterranean formation without the curing agent coming in contact with the curable resin, thus causing curing. In this manner, the curable resin can be placed into the subterranean formation at the desired location, coat the particles of the particle pack, and then begin curing due to an interaction with the curing agent.

The stabilizing agent and destabilizing agent can be selected from the group consisting of a nonionic surfactant, an anionic surfactant, and combinations thereof.

The emulsions also include a destabilizing agent. The destabilizing agent can be the same compound as the stabilizing agent or a different compound (e.g., a cationic surfactant). According to certain embodiments, the destabilizing agent de-stabilizes the emulsions. As used herein, the term "de-stabilizes" and all grammatical variations thereof means that the micelles of the emulsion break and no longer sequester the curable resin and the curing agent in the micelle center and the emulsion can cream, flocculate or coalesce. Without being limited by theory, it is believed that the de-stabilization of the emulsions allows the curing agent to come in contact with the curable resin, thus causing the resin to begin curing. The destabilizing agent can be "activated" (i.e., the destabilizing agent breaks the micelles and releases the resin and curing agent from the micelle centers) by temperature, pressure, or mixing and chemically interacting with wellbore fluids. By way of example, a surfactant can act as a stabilizing agent at the wellhead before introduction into the subterranean formation; however, after the emulsions reach the portion of the wellbore to be treated, then the increased temperature or a chemical interaction with ions present in wellbore fluids can cause the surfactant to de-stabilize the emulsions.

The destabilizing agent can be in a concentration in the range of about 0.1% to about 10% by volume of the emulsion. The destabilizing agent can also be in at least a sufficient concentration such that the micelles break and the curable resin and the curing agent are no longer sequestered in the center of the micelles. According to certain embodiments, the curable resin and the curing agent come in contact with each other after no longer being sequestered in the micelle centers. Accordingly, the curing agent causes the curable resin to cure after coming in contact with the curable resin. The emulsions can also include a catalyst, for example triethylamine, for causing a chemical reaction to take place between the destabilizing agent and other ions present in wellbore fluids to destabilize the emulsions.

For the first and second emulsions, it is to be understood that the stabilizing agent can be the same or different for the first and second emulsions. Moreover, the destabilizing agent can be the same or different for the first and second emulsions, so long as the stabilizing agent(s) selected provides a stable emulsion and the destabilizing agent(s) selected de-stabilizes the emulsions after introduction into the subterranean formation.

The methods include introducing the aqueous-based fluid and the emulsion or the first and second emulsions into the subterranean formation. The step of introducing can also include introducing the aqueous-based fluid and the emulsion or the first and second emulsions into a well, wherein the well penetrates the subterranean formation. The well can be, without limitation, an oil, gas, or water production well, an injection well, or a geothermal well. The well can also be an offshore well. The particles can already be located within the subterranean formation prior to the step of introducing. The step of introducing can also include creating or extending one or more fractures in the subterranean formation. At least one of the fluids (i.e., the aqueous-based fluid, the emulsion, the first emulsion, or the second emulsion) can also contain the particles of the particle pack, such as proppant or gravel. Accordingly, the step of introducing can further include introducing the particles into the subterranean formation.

The aqueous-based fluid and the emulsion or the first and second emulsions are commingled prior to introduction and are introduced simultaneously. The commingling can occur within about a maximum of about 1 hour to about 5 minutes before introduction. The commingling can also occur as the fluid and emulsions are being introduced. For example, the first emulsion can flow through a first pipeline and the second emulsion can flow through a second pipeline, and the first and second pipelines can join together at a junction point near the wellhead and commingle and flow together simultaneously into a tubing string and into the well. The aqueous-based fluid and the emulsion or the first and second emulsions can also be mixed together prior to introduction using a suitable mixing apparatus.

The methods include causing or allowing the curable resin to cure. The step of causing can occur when the formation conditions are insufficient to cause the destabilizing agent to become activated to break the micelles of the emulsion(s). According to certain embodiments, the step of causing can include introducing a heated fluid into the subterranean formation to cause an increase in temperature in the area surrounding the destabilizing agent or introducing a fluid containing the ions necessary to cause activation of the destabilizing agent. As discussed above, when the destabilizing agent becomes activated and breaks the micelles, then the curing agent comes in contact with the curable resin, which causes the curable resin to cure. One of ordinary skill in the art will be able to select the necessary mechanism by which activation of the destabilizing agent can be achieved based in part, on the conditions of the subterranean formation, the exact destabilizing agent chosen and the means by which the destabilizing agent can be activated (e.g., temperature, pressure, chemical reaction, etc.). The step of allowing can be performed when the subterranean formation conditions are sufficient to cause the destabilizing agent to become activated (e.g., the formation temperature at the location of the destabilizing agent is greater than or equal to a temperature necessary to cause activation).

EXAMPLES

To facilitate a better understanding of the preferred embodiments, the following examples of certain aspects of the preferred embodiments are given. The following examples are not the only examples that could be given according to the preferred embodiments and are not intended to limit the scope of the invention.

Figure 1A:
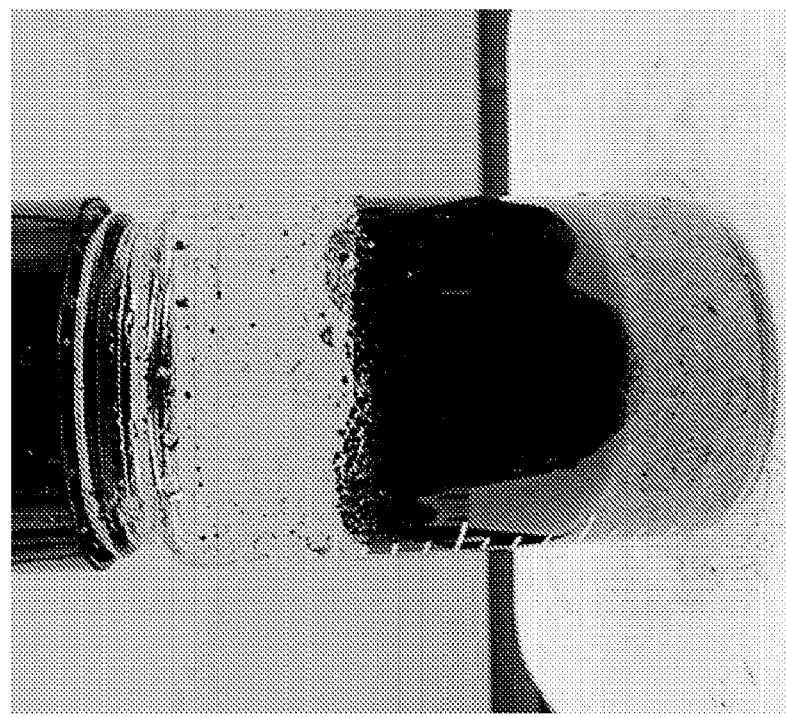

A curable resin system was prepared by mixing 3 milliliters (mL) of EXPEDITE™ 225 part A polyepoxy resin, 10 mL of dimerized fatty acid as the curing agent, and 0.1 mL of triethylamine stabilizing agent and de-stabilizing agent. The polymerization was conducted at 225° F. (107° C.) for 48 hours. After 48 hours, 3 grams (g) of this cured resin was then dry coated onto 100 g of 20/40-mesh Brady sand to simulate formation particles. The coated sand mixture was then suspended in 3% potassium chloride (KCl) brine (shown as FIG. 1B). It was observed that the coated sand was quite tacky and tended to agglomerate forming sand clusters or blobs. To this suspension, 0.5 g of coal fines to simulate formation fines was added to the container. Another container containing the same sand, brine solution, and coal fines except without the resin system was made to serve as a control (shown as FIG. 1A). The contents of the containers were shaken vigorously by hand. FIGS. 1A and 1B show the comparison of the control and resin-coated sand with the resin system. As can be seen in FIG. 1A, the sand is not consolidated and the coal is dispersed throughout the brine. However, as can be seen in FIG. 1B, the resin-coated sand is consolidated together and there is improved effectiveness in grabbing and trapping the coal fines.

Figure 2B:
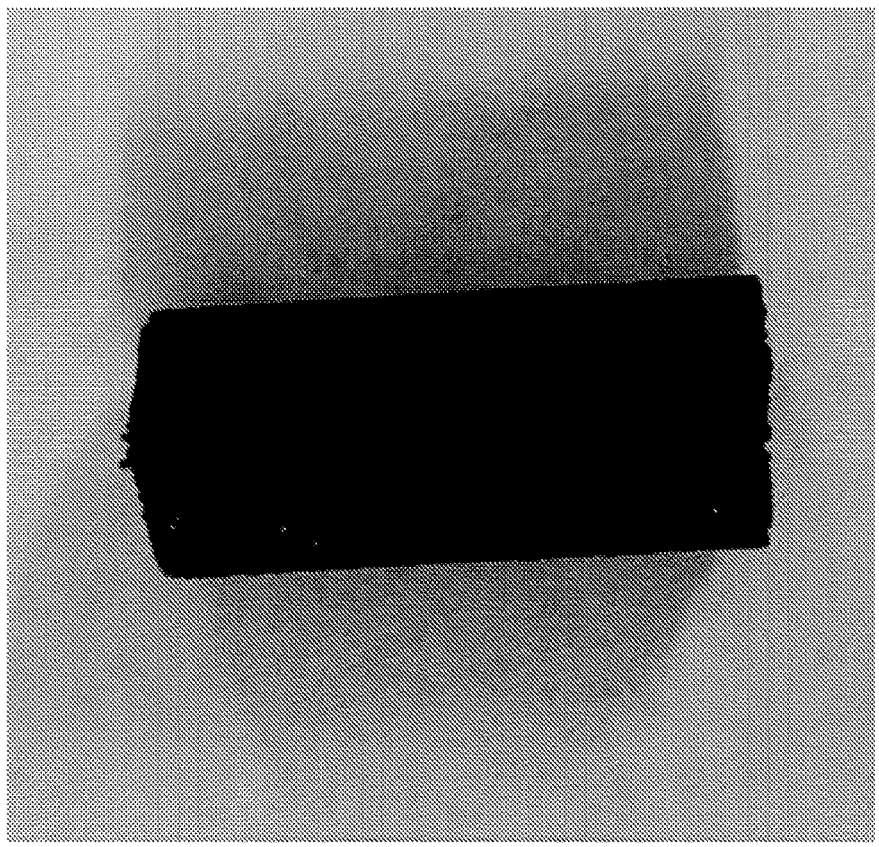
FIGS. 2A and 2B are photographs of the particle packed cores from FIGS. 1A and 1B.
Figure 2A:
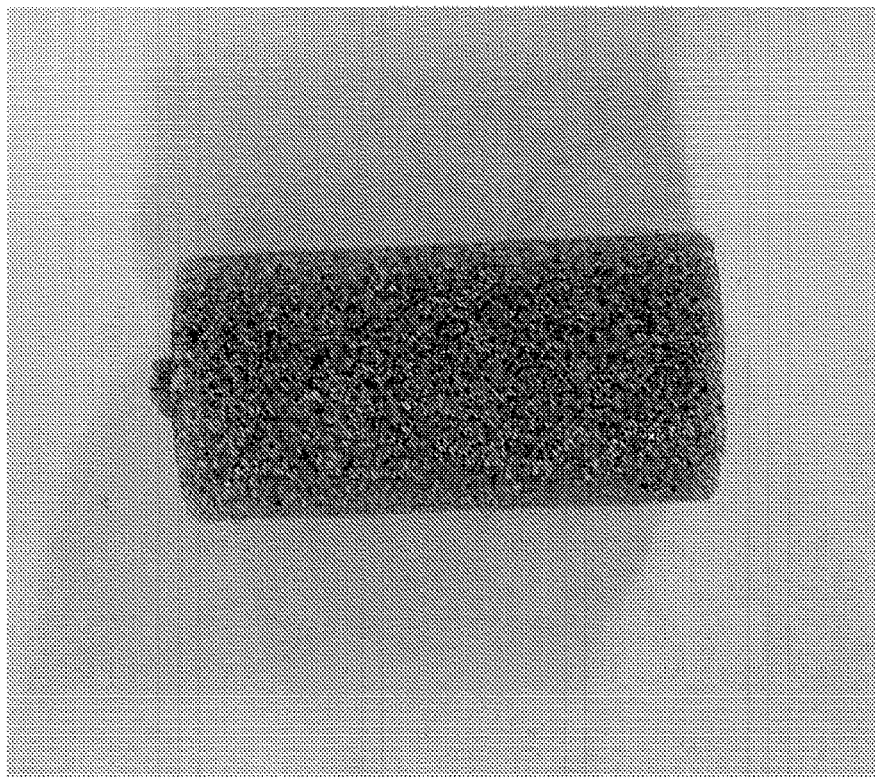

The sands from FIGS. 1A and 1B were packed into a 5 inch long cylinder having an inner diameter of 1 inch. The column was capped and then placed in an oven and cured at 225° F. (107° C.) for 48 hours. After curing, each sand pack was extruded from the chamber and cut into a 1 inch by 2 inch cube for destructive or unconfined compressive strength (UCS) testing and had a compressive strength of 140 pounds force per square inch (psi). It was observed that even though the control core (FIG. 2A) possessed some consolidation, the coal fines were not trapped. By contrast, the core containing the curable resin system (FIG. 2B) had improved consolidation and was very tacky thereby trapping the coal fines.

The exemplary fluids and additives disclosed herein may directly or indirectly affect one or more components or pieces of equipment associated with the preparation, delivery, recapture, recycling, reuse, and/or disposal of the disclosed fluids and additives. For example, the disclosed fluids and additives may directly or indirectly affect one or more mixers, related mixing equipment, mud pits, storage facilities or units, fluid separators, heat exchangers, sensors, gauges, pumps, compressors, and the like used generate, store, monitor, regulate, and/or recondition the exemplary fluids and additives. The disclosed fluids and additives may also directly or indirectly affect any transport or delivery equipment used to convey the fluids and additives to a well site or downhole such as, for example, any transport vessels, conduits, pipelines, trucks, tubulars, and/or pipes used to fluidically move the fluids and additives from one location to another, any pumps, compressors, or motors (e.g., topside or downhole) used to drive the fluids and additives into motion, any valves or related joints used to regulate the pressure or flow rate of the fluids, and any sensors (i.e., pressure and temperature), gauges, and/or combinations thereof, and the like. The disclosed fluids and additives may also directly or indirectly affect the various downhole equipment and tools that may come into contact with the fluids and additives such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b")

disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of treating particles of a particle pack located in a subterranean formation comprising:
    providing a first emulsion, wherein the first emulsion comprises a curable resin;
    providing a second emulsion, wherein the second emulsion comprises a curing agent, wherein the curing agent is a dimer acid, a dimer diamine, or a trimer acid; wherein the curing agent causes the curable resin to cure,
    wherein both of the first and second emulsions comprise:
        (A) an internal phase comprising a hydrocarbon liquid;
        (B) an external phase comprising an aqueous liquid;
        (C) a stabilizing agent; and
        (D) a destabilizing agent;
    introducing the first and second emulsions into the subterranean formation, wherein the first and second emulsions are commingled prior to introduction, and wherein the first and second emulsions are introduced simultaneously; and
    causing or allowing the curing agent to cure at least some of the curable resin after the step of introducing.

2. The method according to claim 1, wherein the particles are selected from the group consisting of proppant, gravel, subterranean formation particles, or combinations thereof.

3. The method according to claim 1, wherein the curable resin coats the particles prior to curing.

4. The method according to claim 1, wherein the curable resin is an epoxy, diepoxy, or polyepoxy resin.

5. The method according to claim 1, wherein the curing agent is in a concentration such that at least some of the curable resin cures after introduction into the subterranean formation.

6. The method according to claim 1, wherein the hydrocarbon liquid is selected from the group consisting of: a fractional distillate of crude oil; a fatty derivative of an acid, an ester, an ether, an alcohol, an amine, an amide, or an imide; a saturated hydrocarbon; an unsaturated hydrocarbon; a branched hydrocarbon; a cyclic hydrocarbon; and any combination thereof.

7. The method according to claim 1, wherein the curable resin and the curing agent are hydrophobic.

8. The method according to claim 7, wherein the curable resin and the curing agent are soluble or miscible in the hydrocarbon liquid.

9. The method according to claim 1, wherein the aqueous liquid is selected from the group consisting of freshwater, saltwater, sea water, brackish water, and combinations thereof.

10. The method according to claim 1, wherein the stabilizing agent is a surfactant.

11. The method according to claim 1, wherein the stabilizing agent provides a stable first emulsion and second emulsion.

12. The method according to claim 11, wherein the stabilizing agent forms micelles with the curable resin sequestered in micelle centers within the internal phase of the first emulsion and forms micelles with the curing agent sequestered in micelle centers within the internal phase of the second emulsion.

13. The method according to claim 12, wherein the destabilizing agent is in at least a sufficient concentration such that the micelles break and the curable resin and the curing agent are no longer sequestered in the center of the micelles.

14. The method according to claim 1, wherein the stabilizing agent is in a concentration in the range of about 0.1% to about 10% by volume of the emulsion.

15. The method according to claim 1, wherein the stabilizing agent and destabilizing agent are selected from the group consisting of a nonionic surfactant, an anionic surfactant, and combinations thereof.

16. The method according to claim 1, wherein the destabilizing agent de-stabilizes the emulsions.

17. The method according to claim 16, wherein the destabilizing agent becomes activated by temperature, pressure, or mixing and chemically interacting with wellbore fluids after the step of introducing.

18. The method according to claim 1, wherein the first and second emulsions are mixed together prior to introduction using a suitable mixing apparatus.

19. The method according to claim 1, wherein the step of introducing comprises using one or more pumps.

20. A method of treating particles of a particle pack located in a subterranean formation comprising:
    providing an aqueous-based fluid, wherein the fluid comprises an aqueous liquid and a curable resin; providing an emulsion, wherein the emulsion comprises a curing agent, wherein the curing agent is a dimer acid, a dimer diamine, or a trimer acid; wherein the curing agent causes the curable resin to cure, wherein the second emulsion comprises:
        (A) an internal phase comprising a hydrocarbon liquid;
        (B) an external phase comprising an aqueous liquid;
        (C) a stabilizing agent; and
        (D) a destabilizing agent;
    introducing the fluid and the emulsion into the subterranean formation, wherein the fluid and the emulsion are commingled prior to introduction, and wherein the fluid and the emulsion are introduced simultaneously; and
    causing or allowing the curing agent to cure at least some of the curable resin after the step of introducing.

* * * * *